United States Patent [19]

Minhas et al.

[11] 4,061,810

[45] Dec. 6, 1977

[54] FLAME-RETARDANT CARPET AND COMPOSITION FOR PREPARING THE SAME

[75] Inventors: Pritam Singh Minhas, Mendham, N.J.; Bernard Sukornick, Williamsville, N.Y.

[73] Assignee: Allied Chemical Corporation, Morris Township, N.J.

[21] Appl. No.: 727,072

[22] Filed: Sept. 27, 1976

[51] Int. Cl.² .......................... B32B 3/02; B32B 33/00
[52] U.S. Cl. ........................................ 428/85; 252/8.1; 428/95; 428/96; 428/97; 428/920; 428/921
[58] Field of Search ..................... 428/85, 95, 96, 97, 428/420, 921; 252/8.1

[56] References Cited

U.S. PATENT DOCUMENTS

| | | | |
|---|---|---|---|
| 3,663,345 | 5/1972 | Jaisinghani | 428/97 |
| 3,719,547 | 3/1973 | Martin | 428/96 |
| 3,956,139 | 5/1976 | Whelan | 428/921 |
| 3,985,926 | 10/1976 | Schwartz | 428/97 |

*Primary Examiner*—Marion E. McCamish
*Attorney, Agent, or Firm*—Fred L. Kelly

[57] ABSTRACT

Combinations of certain hydroxycarboxylic acids with certain metal oxides and hydroxides provide unexpectedly enhanced flame retardancy to carpets, said flame retardancy being durable to usual carpet cleaning procedures.

50 Claims, No Drawings

FLAME-RETARDANT CARPET AND COMPOSITION FOR PREPARING THE SAME

BACKGROUND OF THE INVENTION

This invention relates to flame-retardant carpets and compositions which impart improved flame retardancy thereto. In one of its more specific embodiments, this invention relates to flame-retardant polyester and polyamide carpets and process for the preparation thereof.

A number of metal compounds have been reported in the literature as flame retardants for various substrates. By far the most notable prior art compounds are antimony oxide and antimony chloride. Other metal compounds described as fire retardants include phosphates and borates of alkali metals and alkaline earth metals, aluminum hydrate, titanium salts, tin salts, and double salts such as potassium hexafluorozirconate and potassium hexafluorotitanate.

When applied to carpets, most of the prior art flame-retardant materials provide flame retardancy which is not durable to usual cleaning procedures unless the compounds are incorporated in the polymeric materials, e.g., by incorporating the flame retardant in the polymer melt during production of polyester or polyamide fibers. Unfortunately, incorporation of the flame retardant in the polymer melt may cause serious problems such as change of melt viscosity of change of physical properties of the fibers produced.

In recent years, much research has been carried out directed to production of flame-retardant carpeting. The following patents indicate the state of this art. U.S. Pat. No. 3,418,267, to W. F. Busse, relates to flame-resistant polyamides and process thereof. The patent discloses that polyamide resin is made flame retardant by incorporating therein from 5 to 20 percent by weight of an organic halide, e.g., chlorinated biphenyl, which is reactive with the resin only at its pyrolysis temperature, and from 3 to 15 percent by weight of an oxide of tin, lead, copper, iron, zinc, or antimony.

U.S. Pat. No. 3,663,345, to G. G. Jaisinghani, discloses a flame-retardant carpet in which the pile fibers are fixed to the primary backing by a compound comprising a latex binding material combined with an aluminum hydrate.

U.S. Pat. No. 3,719,547, to D. H. Martin et al., describes a flame-retardant pile fabric. A fibrous layer composed of combustible filaments or fibers extends from the top surface of a fibrous backing to present a pile surface. A coating of a film-forming halogen-containing polymer and a water-insoluble organophosphorus compound is applied to and confined essentially to the top surface of the backing. Where the backing is made of a thermoplastic material, a coating of the halogen-containing polymer may be used without the organo-phosphorus compound.

It has been suggested in U.S. Pat. No. 3,956,236, to F. E. Evans, et al., that flame resistance of carpets, such as polyamide and polyester carpets, can be increased by adding a synergistic composition comprising a metal salt of certain organic acids, particularly metal salts of hydroxycarboxylic acids, with certain organic acids or their ammonium salts, particularly hydroxycarboxylic acids or their ammonium salts. Also, U.S. Pat. No. 3,943,100, to M. B. Berenbaum et al., described flame retardants based on certain organic acids, e.g., gallic acid, citric acid, or tartaric acid, or the ammonium, lithium or magnesium salts thereof. Although these patents constitute a major contribution to this art, investigations have been continued to develop an improved flame-retardant carpet wherein the flame retardancy is particularly durable to usual carpet cleaning procedures.

SUMMARY OF THE INVENTION

In accordance with this invention, it has been discovered that polyester and polyamide carpets can be treated with certain synergistic additive compositions to give a flame-retardant carpet wherein the flame retardancy is particularly durable to usual carpet cleaning procedures.

The additive flame-retardant composition with which the carpet is treated comprises:

a. About 10 to about 90 weight percent of a polyvalent metal compound selected from the group consisting of oxides and hydroxides of tin, antimony, aluminum, and zinc; and b. About 10 to about 90 weight percent of a hydroxycarboxylic acid selected from the group consisting of malic acid, citric acid, tartaric acid, gallic acid, and 2,4-dihydroxybenzoic acid.

The combination of the polyvalent metal oxide or hydroxide and the hydroxycarboxylic acid as defined above provides synergistic improvement in flame retardance of the carpet. Moreover, surprisingly, this flame retardance is durable to usual carpet cleaning procedures.

The process of the present invention for increasing the flame retardance of the polyester or polyamide carpet wherein said flame retardancy has improved durability to carpet cleaning procedures, comprises treating the carpet with from 1 to 15 weight percent of the foregoing composition and curing said composition on the carpet at a temperature of 100° to 200° C., preferably at a temperature of 100° to 150° C.

The present invention provides a flame-retardant carpet which retains its aesthetic properties and is more flame retardant than prior art carpets, particularly after cleaning said carpet. We postulate that this improvement involves a synergistic interaction between the several elements of the present invention. In one embodiment, the present invention provides a flame-retardant carpet having a relatively pliable primary backing and a tufted surface, said surface being comprised of fibers selected from the group consisting of polyester and polyamide fibers, said carpet having incorporated therein from 1 to 15 percent by weight of the foregoing composition.

The term "flame-retardant carpet" is used herein to mean that the carpet burns very slowly when exposed in air to a direct flame or its equivalent. The preferred method of testing for flame-retardant properties is a modified United States Department of Commerce test, DOC FF 1-70, wherein a 250 watt heat lamp is positioned 5 inches from the carpet surface and is controlled by a variac. The lamp is turned on for 5 minutes at a preset voltage on the variac in order to provide a more vigorous test. The higher the voltage applied to the heat lamp, the greater the heat applied to the carpet prior to burning the carpet. The temperature of the carpet is measured with a thermocouple. The carpet is then burned by placing a 150 milligram methenamine pill in the center of the carpet. The pill is then ignited. The higher the temperature, which can be applied to the carpet before the carpet fails to extinguish within 90 seconds after the pill has finished burning, the better the flame-retardant properties of the carpet.

The durability of the flame-retardant treatment is preferably determined by retesting the carpet in accordance with the above-described flame-retardancy test, after laundering the treated carpet by a procedure described in Technical Manual of the American Association of Textile Chemists and Colorists, AATCC 124-1973.

DESCRIPTION OF THE PREFERRED EMBODIMENT

The preferred process of this invention is an improvement over known processes for preparing carpeting. When carpeting is conventionally manufactured, the fibers are tufted on a relatively pliable primary backing which may be manufactured from any suitable materials such as jute or a man-made fiber such as polypropylene. The non-wear side of the backing is then coated with a bonding material of any suitable type such as latex. The latex serves to hold the fibers in place so that they cannot be pulled free from the primary backing, and also to bond the primary backing to the secondary backing. In the past, clay has been added to the latex as a filler to reduce the cost of the bonding compound. The secondary backing, which may also be jute or artificial fiber, strengthens the carpet and ensures that the bonding material does not come into contact with the floor upon which the carpet is laid.

Accordingly, the preferred process of the present invention may be briefly stated as follows: In a process for producing a carpet having a relatively pliable primary backing through which polyamide or polyester fibers are tufted, the improvement which comprises adding to said carpet from about 1 to 15 weight percent of a composition comprising a. about 10 to about 90 weight percent of a polyvalent metal compound selected from the group consisting of oxides and hydroxides of tin and antimony, and b. about 10 to about 90 weight percent of a hydroxycarboxylic acid selected from the group consisting of citric acid, tartaric acid, and gallic acid; and curing said composition on the carpet at a temperature of about 100° to 150° C., whereby said carpet has improved flame retardancy and said flame retardancy has improved durability to carpet cleaning procedures.

It will be understood that the above-described flame-retardant carpet is normally given a secondary backing, e.g., it may be given a secondary backing of jute using a latex binder. A conventional latex may be used, e.g., a styrene-butadiene latex, which is commercially available. A latex binder containing no flame retardant is normally adequate. However, if desired, a flame retardant may be incorporated in the latex material, e.g., the bonding substance may comprise a latex material and a hydrate material selected from the group consisting of aluminum hydroxide, hydrated aluminum oxide and hydrated aluminum silicates, such as kaolinite, dickite, nacrite and endellite, the ratio by weight of said latex material to said hydrate material being from 1:2 to 1:4.5.

The primary carpet backing is made from any suitable material. It may be a conventional woven jute construction. Also, the backing may be made of a nonwoven fibrous mass made of cellulosic or noncellulosic material, including nylon, polyester, and polyolefin. Other fabric backing structures likewise can be used.

The preferred polyamides which are useful in the improved flame-retardant carpets of the present invention include polycaprolactam, the polyamides which are derived from the condensation of a dicarboxylic acid with a diamine, such as polyhexamethylene adipamide and polyhexamethylene sebacamide, and copolymers thereof. The preferred polyesters are the linear terephthalate polyesters, i.e., polyesters of a glycol containing from 2 to 20 carbon atoms and a dicarboxylic acid component containing at least about 75% terephthalic acid. The remainder, if any, of the dicarboxylic acid component may be any suitable dicarboxylic acid such as sebacic acid, adipic acid, or isophthalic acid. The glycols may contain more than two carbon atoms in the chain, e.g., diethylene glycol, butylene glycol, or decamethylene glycol. Examples of linear terephthalate polyesters which may be employed include poly(ethylene terephthalate) and poly(butylene terephthalate).

In treating the carpet in accordance with the process of this invention, from about 1 to 15 weight percent of the treating composition is applied to the carpet, as previously described. In practicing the invention, the composition is dissolved in a solvent, preferably water, to make a solution of about 0.5 to about 12 weight percent and more. The carpet is then soaked by the solution, which may contain other additives commonly used in finishing baths to improve properties such as penetration. The carpet is then squeezed with any suitable apparatus such as pad rollers to remove excess solution. The squeezing apparatus, such as the rollers, is adjusted to give from about 25 to about 300 weight percent wet pick-up. The carpet is then dried and cured in a dryer or oven, preferably at temperatures of 100° to 150° C. The solution may be applied to the carpet in numerous ways. For example, the carpet may be immersed in the solution or the solution may be sprayed upon the carpet or applied to the carpet by means of pad rollers.

In accordance with another preferred procedure, after padding, the wet carpet is exposed to steam at atmospheric pressure for several minutes, rinsed with water and dried at 100° to 150° C. The steamed carpet is superior to unsteamed carpet in appearance and softness of hand.

The following examples serve to illustrate the present invention. Unless otherwise indicated, all parts and percentages are by weight.

EXAMPLE 1

About 132 grams of gallic acid monohydrate is dissolved in 1,000 grams of hot distilled water. The solution is allowed to cool to about 40° C., and 87.6 grams of an aqueous dispersion of colloidal antimony oxide is added and uniformly distributed in the solution, the weight ratio of gallic acid monohydrate to antimony oxide solids being about 5.5:1.0. The resulting composition is made up to 3,500 grams with distilled water and used to produce a flame-retardant carpet as described in the following example. For convenience, this composition may be called Composition A.

EXAMPLE 2

In accordance with this invention, Composition A of Example 1 is used to produce a flame-retardant carpet having excellent durability to carpet cleaning procedures. A typical polyamide carpet may be produced as follows: A reactor equipped with a heater and stirrer is charged with a mixture of 1,520 parts of e-caprolactam and 80 parts of aminocaproic acid. The mixture is then flushed with nitrogen and stirred and heated to 255° C.

over a one-hour period at atmospheric pressure to produce a polymerization reaction. The heating and stirring is continued at atmospheric pressure under a nitrogen sweep for an additional four hours in order to complete the polymerization. Nitrogen is then admitted to the reactor and a small pressure is maintained while the polymer is extruded from the reactor in the form of a polymer ribbon. The polymer ribbon is subsequently cooled, pelletized, washed and then dried. The polymer is a white solid having a relative viscosity of about 50 to 60 as determined at a concentration of 11 grams of polymer in 100 ml. of 90 percent formic acid at 25° C. (ASTM D-789-62T).

The polymer is melt extruded under pressure of 1,500 psig to a 70-orifice spinnerette to produce a fiber having about 3,600 denier. The fiber is collected, drawn at about 3.2 times the extruded length and textured with a steam jet to produce yarn suitable for use in carpet. The yarn is two-plied by twisting two ends together with a 1.5 S twist. The yarn is tufted into a level loop 22 ounce/yard$^2$ carpet is about 8 stitch rate. A relatively pliable nonwoven polypropylene fabric is used as the primary backing. Tufting is carried out on a conventional tufting machine operated to give a pile having a height of 5/32 to 7/32 inch. An untreated portion of this carpet is used as a control and a second portion is padded with Composition A of Example 1 to give a wet pickup sufficient to deposit 6.6 percent of the gallic acid monohydrate and 1.2 percent antimony oxide solids on the fibers. The treated carpet is dried at 125° C. in an air circulating oven until dry, then cured at 125° C. for about 10 minutes. The treated and untreated carpets are then given a jute secondary backing using a conventional latex binder containing no flame retardant. For convenience, the treated carpet is called Carpet A and the untreated carpet is called Carpet B. The following table compares the carpets with respect to flame retardancy (before and after laundering) as measured by the above-described flame retardancy test (DOCFF 1-70), together with the above-described laundering procedure (AATCC 124-1973). The above shows the highest temperature applied to the carpet before the carpet fails to extinguish within 90 seconds after the pill has finished burning. Measurements were made on the carpet initially and after 1-5 launderings.

| Carpet System | Highest Temperature Before Failure, °C. | | |
|---|---|---|---|
| | Initial | After 1 Laundering | After 5 Launderings |
| Carpet A | 205 | 203 | 206 |
| Carpet B | 141 | 130 | 115 |

These results indicate that the fire retardancy of Carpet A is significantly greater than that of Carpet B and that said fire retardancy of Carpet A is surprisingly durable to the cleaning procedure.

EXAMPLE 3

The procedure of Example 2 is followed except that in place of Composition A of Example 1, the carpet is padded with an aqueous solution of gallic acid monohydrate in amount sufficient to deposit 6.0 percent of the gallic acid monohydrate on the fibers. For convenience, this treated carpet is called Carpet C.

In a similar manner, the procedure of Example 2 is followed except that in place of Composition A, the carpet is padded with aqueous colloidal antimony oxide in amount sufficient to deposit 1.5 percent antimony oxide solids on the fibers. For convenience, this treated carpet is called Carpet D. The following table compares Carpets C and D with Carpet A of Example 2, using the above-described flame retardancy test, before and after laundering.

| Carpet System | Highest Temperature Before Failure, ° C. | |
|---|---|---|
| | Initial | After 1 Laundering |
| Carpet A | 205 | 203 |
| Carpet C | 201 | 153 |
| Carpet D | 155 | Not Required |

These results indicate that Carpet A of Example 2 is significantly better than Carpet C or Carpet D, i.e., colloidal antimony oxide alone provides little flame retardancy, whereas gallic acid alone provides good initial flame retardancy but this good flame retardancy is not durable to laundering.

EXAMPLE 4

The procedure of Example 2 is followed except that after padding the carpet with Composition A of Example 1, the wet carpet is exposed to steam for about 10 minutes, then rinsed with cold water prior to drying. The steamed carpet is much superior to unsteamed carpet of Example 2 in appearance and softness of hand. The resulting dried carpet is given a secondary backing as described in Example 2, then tested using the above-described flame retardancy test, before and after laundering. The test shows excellent initial flame retardancy which is durable to 10 launderings or more.

EXAMPLE 5

The procedure of Example 2 is followed except that the weight of antimony oxide deposited on the carpet fibers is changed relative to the weight of gallic acid deposited on the fiber. Flame retardancy tests indicate that good results are obtained over a broad range of gallic acid to antimony oxide ratios; however, optimum results appear evident using about 2-3 percent gallic acid and about 2.1-3.2 percent antimony oxide on the carpet fiber. We particularly prefer to use gallic acid and antimony oxide in proportions which are in the weight ratio to form antimony subgallate, although we have no evidence that this compound is actually formed in the carpet.

EXAMPLE 6

The procedure of Example 2 is followed except that instead of using Composition A of Example 1, the individual components of Composition A are applied sequentially, i.e., one at a time. Flame retardancy is effectively imparted to the samples, but durability of said flame retardancy to laundering is not as good as Carpet A of Example 2.

EXAMPLE 7

The procedure of Example 2 is followed except that in place of Composition A of Example 1, the carpet is padded with an aqueous solution of gallic acid fully neutralized with stannic hydroxide in amount to deposit the equivalent of 6.4 percent gallic acid and 1.6 percent stannic hydroxide on the fibers. For convenience, this treated carpet is called Carpet E. The following table compares Carpet E with Carpet A of Example 2, using the flame retardancy test, before and after laundering.

| Carpet System | Highest Temperature Before Failure, ° C. | |
| --- | --- | --- |
| | Initial | After 1 Laundering |
| Carpet A | 205 | 203 |
| Carpet E | 203 | 193 |

EXAMPLE 8

The procedure of Example 2 is followed except that in place of Composition A of Example 1, the carpet is padded with an aqueous solution of tartaric acid and colloidal antimony oxide in amount sufficient to deposit the equivalent of 5 percent tartaric acid and 2 percent antimony oxide on the fibers. For convenience, this treated carpet is called Carpet F. The following table compares Carpet F with Carpet A of Example 2, using the flame retardancy test, before and after laundering.

| Carpet System | Highest Temperature Before Failure, ° C. | |
| --- | --- | --- |
| | Initial | After 3 Launderings |
| Carpet A | 205 | 207 |
| Carpet F | 205 | 182 |

EXAMPLE 9

The procedure of Example 2 is followed except that in place of Composition A of Example 1, the carpet is padded with an aqueous solution of citric acid and colloidal antimony oxide in amount sufficient to deposit the equivalent of 5.1 percent citric acid and 2.0 percent antimony oxide on the fibers. For convenience, this treated carpet is called Carpet G. The following table compares Carpet G with Carpet A of Example 2, using the flame retardancy test, before and after laundering.

| Carpet System | Highest Temperature Before Failure, ° C. | |
| --- | --- | --- |
| | Initial | After 3 Launderings |
| Carpet A | 205 | 207 |
| Carpet G | 208 | 184 |

EXAMPLE 10

The procedure of Example 2 is followed except that in place of Composition A of Example 1, the carpet is padded with an aqueous solution of malic acid and colloidal antimony oxide in amount sufficient to deposit the equivalent of 5 percent malic acid and 2 percent antimony oxide on the fibers. For convenience, this treated carpet is called Carpet H. The following table compares Carpet H with Carpet A of Example 2, using the flame retardancy test, before and after laundering.

| Carpet System | Highest Temperature Before Failure, ° C. | |
| --- | --- | --- |
| | Initial | After 1 Laundering |
| Carpet A | 205 | 203 |
| Carpet H | 202 | 167 |

EXAMPLE 11

The procedure of Example 2 is followed except that in place of Composition A of Example 1, the carpet is padded with an aqueous solution of 2,4-dihydroxybenzoic acid and colloidal antimony oxide in amount sufficient to deposit the equivalent of 5 percent 2,4-dihydroxybenzoic acid and 2 percent antimony oxide on the fibers. For convenience, this treated carpet is called Carpet I. The following table compares Carpet I with Carpet A of Example 2, using the flame retardancy test, before and after laundering.

| Carpet System | Highest Temperature Before Failure, ° C. | |
| --- | --- | --- |
| | Initial | After 1 Laundering |
| Carpet A | 205 | 203 |
| Carpet I | 195 | 140 |

EXAMPLE 12

The procedure of Example 2 is followed except that in place of Composition A of Example 1, the carpet is padded with an aqueous solution of gallic acid and aluminum hydroxide in amount sufficient to deposit the equivalent of 5.3 percent gallic acid and 1.5 percent aluminum hydroxide on the fibers. For convenience, this treated carpet is called Carpet J. The following table compares Carpet J with Carpet A of Example 2, using the flame retardancy test, before and after laundering.

| Carpet System | Highest Temperature Before Failure, ° C. | |
| --- | --- | --- |
| | Initial | After 5 Launderings |
| Carpet A | 205 | 206 |
| Carpet J | 204 | 180 |

EXAMPLE 13

The procedure of Example 2 is followed except that in place of Composition A of Example 1, the carpet is padded with an aqueous solution of gallic acid and zinc oxide in amount sufficient to deposit the equivalent of 5 percent tartaric acid and 2.5 percent zinc oxide on the fibers. For convenience, this treated carpet is called Carpet K. The following table compares Carpet K with Carpet A of Example 2, using the flame retardancy test, before and after laundering.

| Carpet System | Highest Temperature Before Failure, ° C. | |
| --- | --- | --- |
| | Initial | After 1 Laundering |
| Carpet A | 205 | 207 |
| Carpet K | 206 | 131 |

The particular polyvalent metal compound and hydroxycarboxylic acid selected are very critical, particularly with respect to durability of the improved flame retardancy to carpet cleaning procedures. Excellent results are obtained with use of antimony oxide, stannic hydroxide, or aluminum hydroxide with gallic acid, citric acid or tartaric acid; however, optimum results are obtained with use of antimony oxide with gallic acid. Additional tests involving use of aqueous solutions of monovalent salts of various hydroxycarboxylic acids, e.g., lithium tartrate, ammonium malate and lithium citrate, in production of flame retardant carpet, show significantly poorer flame retardancy results as compared with results obtained using the process of the present invention. Specifically, using the monovalent salts, the highest temperature before failure in the above-described flame retardancy test is generally no higher than about 160° C. and this flame retardancy is not durable to the above-described laundering procedure.

We claim:

1. A flame retardant carpet having a relatively pliable primary backing and a tufted surface, said surface being comprised of fibers selected from the group consisting of polyester and polyamide fibers, said carpet having from about 1 to 15 weight percent of a composition added thereto, said composition comprising:
   a. about 10 to about 90 weight percent of a polyvalent metal compound selected from the group consisting of oxides and hydroxides of tin, antimony, aluminum and zinc; and
   b. about 10 to about 90 weight percent of a hydroxycarboxylic acid selected from the group consisting of malic acid, citric acid, tartaric acid, gallic acid, and 2,4-dihydroxybenzoic acid.

2. The carpet of claim 1 wherein the fibers are polyamide fibers.

3. The carpet of claim 1 wherein the metal compound is antimony oxide.

4. The carpet of claim 3 wherein the hydroxycarboxylic acid is citric acid, tartaric acid, or gallic acid.

5. The carpet of claim 3 wherein the hydroxycarboxylic acid is gallic acid.

6. The carpet of claim 1 wherein the metal compound is stannic hydroxide.

7. The carpet of claim 6 wherein the hydroxycarboxylic acid is citric acid, tartaric acid, or gallic acid.

8. The carpet of claim 6 wherein the hydroxycarboxylic acid is gallic acid.

9. The carpet of claim 1 wherein the metal compound is aluminum hydroxide.

10. The carpet of claim 9 wherein the hydroxycarboxylic acid is citric acid, tartaric acid, or gallic acid.

11. The carpet of claim 9 wherein the hydroxycarboxylic acid is gallic acid.

12. The carpet of claim 1 wherein the metal compound is zinc oxide.

13. The carpet of claim 1 wherein the hydroxycarboxylic acid is malic acid.

14. The carpet of claim 1 wherein the hydroxycarboxylic acid is citric acid.

15. The carpet of claim 1 wherein the hydroxycarboxylic acid is tartaric acid.

16. The carpet of claim 1 wherein the hydroxycarboxylic acid is gallic acid.

17. The carpet of claim 1 wherein the hydroxycarboxylic acid is 2,4-dihydroxybenzoic acid.

18. In a process for producing a carpet having a relatively pliable primary backing through which polyamide or polyester fibers are tufted, the improvement which comprises adding to said carpet from about 1 to 15 weight percent of composition comprising:
   a. about 10 to about 90 weight percent of a polyvalent metal compound selected from the group consisting of oxides and hydroxides of tin, antimony, aluminum and zinc; and
   b. about 10 to about 90 weight percent of a hydroxycarboxylic acid selected from the group consisting of malic acid, citric acid, tartaric acid, gallic acid, and 2,4-dihydroxybenzoic acid; and curing said composition on the carpet at a temperature of about 100° to 150° C., whereby said carpet has improved flame retardancy and said flame retardancy has improved durability to carpet cleaning procedures.

19. The process of claim 18 wherein the fibers are polyamide fibers.

20. The process of claim 18 wherein the metal compound is antimony oxide.

21. The process of claim 20 wherein the hydroxycarboxylic acid is citric acid, tartaric acid, or gallic acid.

22. The process of claim 20 wherein the hydroxycarboxylic acid is gallic acid.

23. The process of claim 18 wherein the metal compound is stannic hydroxide.

24. The process of claim 23 wherein the hydroxycarboxylic acid is citric acid, tartaric acid, or gallic acid.

25. The process of claim 23 wherein the hydroxycarboxylic acid is gallic acid.

26. The process of claim 18 wherein the metal compound is aluminum hydroxide.

27. The process of claim 26 wherein the hydroxycarboxylic acid is citric acid, tartaric acid, or gallic acid.

28. The process of claim 26 wherein the hydroxycarboxylic acid is gallic acid.

29. The process of claim 18 wherein the metal compound is zinc oxide.

30. The process of claim 18 wherein the hydroxycarboxylic acid is malic acid.

31. The process of claim 18 wherein the hydroxycarboxylic acid is citric acid.

32. The process of claim 18 wherein the hydroxycarboxylic acid is tartaric acid.

33. The process of claim 18 wherein the hydroxycarboxylic acid is gallic acid.

34. The process of claim 18 wherein the hydroxycarboxylic acid is 2,4-dihydroxybenzoic acid.

35. A composition for increasing flame retardance of a carpet consisting essentially of:
   a. about 10 to about 90 weight percent of a polyvalent metal compound selected from the group consisting of oxides and hydroxides of tin, antimony, aluminum, and zinc; and
   b. about 10 to about 90 weight percent of a hydroxycarboxylic acid selected from the group consisting of malic acid, citric acid, tartaric acid, gallic acid, and 2,4-dihydroxybenzoic acid.

36. The composition of claim 35 wherein the metal compound is antimony oxide.

37. The composition of claim 36 wherein the hydroxycarboxylic acid is citric acid, tartaric acid, or gallic acid.

38. The composition of claim 36 wherein the hydroxycarboxylic acid is gallic acid.

39. The composition of claim 35 wherein the metal compound is stannic hydroxide.

40. The composition of claim 39 wherein the hydroxycarboxylic acid is citric acid, tartaric acid, or gallic acid.

41. The composition of claim 39 wherein the hydroxycarboxylic acid is gallic acid.

42. The composition of claim 35 wherein the metal compound is aluminum hydroxide.

43. The composition of claim 42 wherein the hydroxycarboxylic acid is citric acid, tartaric acid, or gallic acid.

44. The composition of claim 42 wherein the hydroxycarboxylic acid is gallic acid.

45. The composition of claim 35 wherein the metal compound is zinc oxide.

46. The composition of claim 35 wherein the hydroxycarboxylic acid is malic acid.

47. The composition of claim 35 wherein the hydroxycarboxylic acid is citric acid.

48. The composition of claim 35 wherein the hydroxycarboxylic acid is tartaric acid.

49. The composition of claim 35 wherein the hydroxycarboxylic acid is gallic acid.

50. The composition of claim 35 wherein the hydroxycarboxylic acid is 2,4-dihydroxybenzoic acid.

* * * * *